Figure 1:
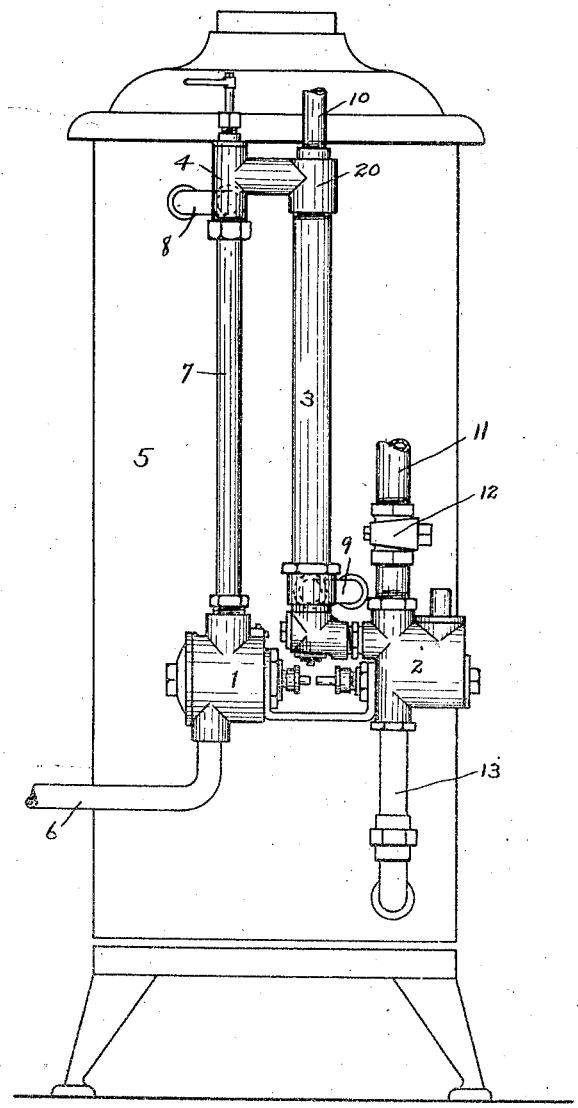

H. EISENACH & W. F. SMITH.
GAS CONTROL VALVE FOR WATER HEATERS.
APPLICATION FILED JULY 8, 1912.

1,078,089.

Patented Nov. 11, 1913.
2 SHEETS—SHEET 1.

WITNESSES:
J. H. Perrault
Hugo W. Kreinbring.

INVENTORS
H. Eisenach & W. F. Smith.
BY Edward N. Pagelsen,
ATTORNEY

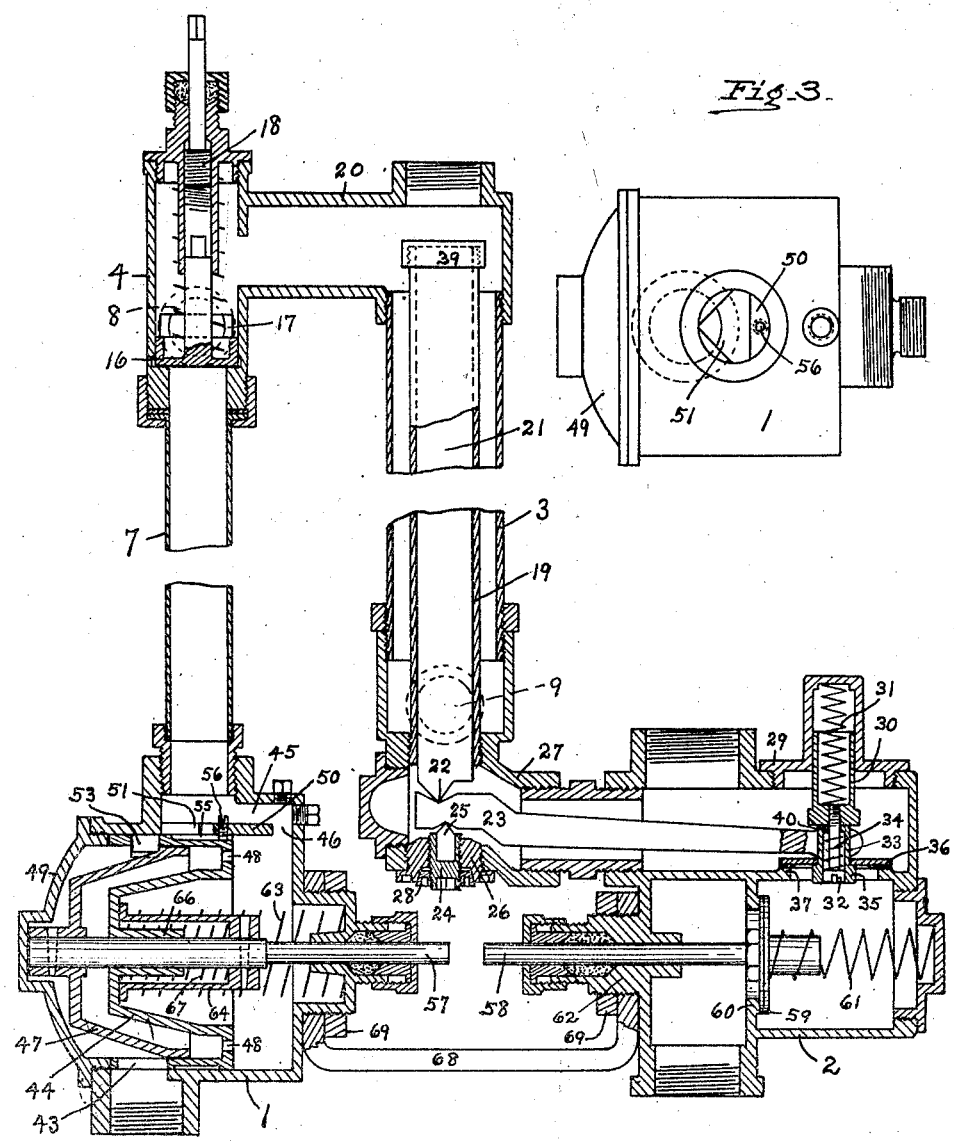

UNITED STATES PATENT OFFICE.

HENRY EISENACH AND WILLIAM F. SMITH, OF DETROIT, MICHIGAN.

GAS-CONTROL VALVE FOR WATER-HEATERS.

1,078,089.  Specification of Letters Patent.  Patented Nov. 11, 1913.

Application filed July 8, 1912. Serial No. 708,395.

*To all whom it may concern:*

Be it known that we, HENRY EISENACH and WILLIAM F. SMITH, citizens of the United States, residing at Detroit, in the county of Wayne and State of Michigan, have invented a new and Improved Gas-Control Valve for Water-Heaters, of which the following is a specification.

This invention relates to automatic valves for controlling the flow of gas to the burners of water heaters, and its object is to provide an improved gas-control valve by which the gas is automatically turned on by the drawing off of water from the heater, and turned off when the drawing off of the water is discontinued.

Another object of this invention is to provide a construction which will permit the circulation of water through the heater during such time as no water is being drawn from the same.

Figure 4:
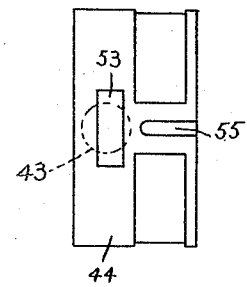
Figure 5:
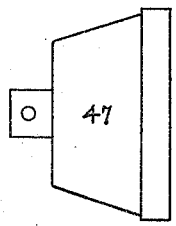

In the accompanying drawings Figure 1 is an elevation of a heater equipped with this improved gas-control valve. Fig. 2 is a vertical section of the valve mechanism. Fig. 3 is a plan of the controlling-valve body. Fig. 4 is a plan of the water-valve. Fig. 5 is a plan of the operating piston.

Similar reference characters refer to like parts throughout the several views.

That type of heaters known to the trade as "instantaneous water heaters" is so constructed that when water is being drawn off, a supply of gas is turned onto the burners so that the water passing through will be heated as fast as it is drawn off. The valve mechanism for controlling the flow of gas is usually equipped with a thermostat so that the flow of gas will be prevented so long as the water passing from the heater is above a certain predetermined temperature. The construction shown in the accompanying drawings is designed to accomplish these ends, and consists principally in a water-valve body 1, a fuel-valve body 2, a thermostat casing 3 and a circulating-valve casing 4, and the mechanism contained in these several parts. The heater 5 is of any desired construction and forms no part of this invention. A water-pipe 6 connects to the water-valve body 1 and a pipe 7 extends from this water-valve body to the circulating-valve body 4. A pipe 8 connects to the circulating-valve body 4 and to the coils within the heater 5, while a pipe 9 connects to the lower end of these coils and to the bottom of the thermostat-casing. The pipe 10 connects to the top of the thermostat-casing and also to the hot-water system of the building, in connection with which the heater is to be used. A fuel-pipe 11 connects to the fuel-valve body 2 and is preferably supplied with a cut-off valve 12 of any desired construction. A pipe 13 connects to the fuel-valve body 2 and to the burners. Any desired type of pilot-light will be employed in connection with this mechanism in the usual manner. When water is drawn from the pipe 10, the pressure in the pipe 7 will be reduced and water will flow up through the pipe 6, through the valve-body 1 and the pipe 7, into the circulating-valve body 4, and lift the valve 16 shown in Fig. 2 sufficiently to pass out through the port 17 into the pipe 8. The height that the valve 16 may rise is controlled by the adjusting screw 18. After passing through the heater and out through the pipe 9, the water will enter the thermostat-casing 3, passing around the brass or copper tube 19, which is rigidly connected at its lower end into the thermostat-casing, and pass out through the top of this casing and pipe 10. A fitting 20 connects the top of the thermostat-casing and the circulating-valve body 4.

Slidably mounted within the tube 19 is a bar 21 of porcelain or other material which has a low co-efficient of expansion. The lower end of this bar 21 is formed with a knife-edge 22 which rests in a notch in the lever 23, which lever is fulcrumed on a pivot 25 carried by an adjusting screw 24, mounted in the plug 26 in the lower end of the fitting 27, which forms the lower end of the thermostat-casing. A jam-nut 28 is adapted to hold this screw 25 in a predetermined position. This fitting 27 connects to the fuel-valve body 2 which is formed with a cap 29 in which is slidable a piston 30, normally held down by means of a spring 31. A screw 32 is carried by the piston 30 and on it is slidable a sleeve 33, which sleeve is normally held upward by a small spring 34. This sleeve is smaller in diameter than the lower end of the piston 30 and is formed with a collar 35 between which, and the lower end of the piston 30, the bifurcated end of the lever 23 extends. A valve-disk 36 is mounted on the sleeve 33, and so long as the water surrounding the tube 19 is above a certain temperature, this valve rests on its seat 37 and prevents the passage of gas through the fuel-valve body. When the temperature of the water falls, the tube 19 contracts, and the cap 39 at its upper end presses down against the upper end of the rod 21, thus forcing down the short arm of the lever 23 and lifting the outer end of the long arm. The pressure of the gas on the valve 36 will hold this valve on its seat during the first portion of the upward movement of the end of the long arm of the lever 23. This will cause the spring 34 to be compressed between the head of the screw 32 and the interior flange 40 at the upper end of the sleeve 33 until the tension of the spring is sufficient to overcome the pressure of the gas on the valve-disk 36. The downward pull of the tube 19 is more than sufficient to overcome the tension of the spring 31 at all times, so that this spring 31 merely insures proper operative contact between the different parts. When the tension on the spring 34 is sufficient to overcome the pressure of the gas on the disk 36, the valve will be lifted entirely free from its seat by this spring, as the pressure then on the lower face of the valve will be as great as on the upper face. It will therefore be seen that the valve 36 will remain on its seat while the water surrounding the tube 19 falls about five degrees in temperature. As this valve is now a distance from its seat, it will require some time to reach its seat, while the temperature of the water surrounding the tube 19 is rising about the same amount. This device obviates an objection to many constructions of thermostat-controlled gas-valves, which move upon small changes of the temperature of the water, and thus cause flickering of the flame of the burners because of the sudden variations in the flow of gas to the same. The first result of the drawing of water from the pipe 10 will be to relieve the pressure in the pipe 7, which pipe connects by means of the passages 45 and 46 with the inner end of the valve-body 1. This end of the valve-body connects with the space between the controlling-valve 44 and the operating piston 47 by means of the holes 48 in the web of the valve 44. When the pressure, therefore, in the pipe 7 is reduced, it is also reduced in all that portion of the valve-body 1 on the inner side of the piston 47, and as a result the pressure in the valve-body on the outer side of the piston 47 will force this piston inwardly. The beginning of the movement of this piston 47 will have no effect on the other parts of the construction. When the piston contacts with the valve 44, this will also be moved inwardly under the pressure of the water between the piston and the head 49. The valve-body is formed with a wall 50 integral therewith, in which is a passage 51, shown in Fig. 3. The valve 44 is formed with a port 53 in the upper part of the cylindrical portion, and with a port 43 in the lower portion, as shown in Figs. 2 and 4. When this valve 44 has been moved inwardly by means of the piston 47, the port 53 will register with the port 51 in the wall 50, and water will then pass up through the outer end of the valve-body 1 from the pipe 6 to the pipe 7. In order to hold the ports 53 and 43 in line with the openings into and out of the valve-body 1, a groove 55 may be formed in the upper face of this valve 44, and a small pin or screw 56 may be mounted in the wall 50, as shown in Fig. 2, and extend into this groove 55, and thus hold the valve 44 from turning in the body, but will not prevent longitudinal movement of the valve and piston. When the piston 47 has been moved inwardly by the pressure of the water on its outer side, the piston-rod 57 will move with it and engage the rod 58 on which the valve 59 is mounted. This valve is normally held on its seat 60 by means of the spring 61. The rod 58 is freely slidable in the head 62 of the gas-valve body 2. The moving of the valve 59 from its seat by means of the water-operated piston 47 does not permit the passage of gas until the temperature of the water passing from the heater around the tube 19 has fallen sufficiently to cause the operation of the thermostat and the lever 23 to lift the valve 36 from its seat, at which time gas will flow through the body 2 and the pipe 13 to the burners. As soon as the flow of water through the pipe 10 has stopped, the pressure at both ends of the body 1 will be equalized, whereupon the spring 63 will force the sleeve 64 secured to the piston-rod 57 and the piston 47 to the left. The spring 61 will then seat the valve 59, thus cutting-off the gas. The hub 66 of the valve 44 extends into the sleeve 64, and a spring 67 within this sleeve operates to the following effect. When the piston moves inwardly and engages the water-valve, its rod 57 engages the gas-valve rod 58. Further movement of the piston causes the water-valve to move inwardly until the port 53 begins to register with the port 51. At this time the pressures at both ends of the valve-body 1 are equal and there is nothing to prevent the spring 63 from moving the piston outward. This movement would permit the spring 61 to close the gas-valve, resulting in the heating flame being extinguished, and cold water flowing from the pipe 10. But at first outward movement of the piston, the spring 67 causes the water-valve to follow it, resulting in the shutting off of the flow through the port 51 and also in the reduction of the pressure at the inner end of the valve-body 1. This reduction immediately results in the inward movement of the piston, the reopening of the gas-valve and of the port 51.

As the construction is very sensitive, these movements are very slight so that the piston, the water-valve and the gas-valve are substantially stationary, their positions depending upon the rate of flow of the water from the pipe 10.

The size of the passage through the ports 51 and 53 will always be just sufficient to permit the flow of the water being drawn off. If too small, the pressure at the inner end of the body 1 will fall instantaneously and the piston will move the valve inwardly immediately. If this passage is too large, the spring 67 will immediately move the valve 44 outwardly. If the valve 44 should stick in the open position, and the flow of water from the pipe 10 be stopped, the pressure at both ends of the body 1 will be immediately equalized and the spring 63 will move the piston 47 and piston-rod 57 outward and the spring 61 will seat the gas-valve 59. For this reason, it is most desirable that the piston 47 and valve 44 be independently movable.

If it is desired to remove any of the mechanism within the valve-body 1, this can be done without drawing off the water, as the valve 16 will prevent any flow from the pipe 10 or from the heater. The water-valve body 1 and the fuel-valve body 2 may be held in proper relation to each other by the bracket 68 and the nuts 69.

It will be noticed that the port 51 in the wall 50 is formed with inclined sides. It sometimes happens that bits of straw and other impurities pass with the water through these control-valves and lodge in the ports. When the ports 53 and 51 register, the water may pass freely, but when the valve 44 is moved outward by means of the springs 63 and 67, the rear wall of the port 53 will pass beyond the inclined walls of the port 51, and any impurities which may lodge across the line of contact will be moved to the sharp corner between the walls of the port 51 and will there be sheared off, if possible. When the valve 44 moves again inwardly, the outer wall of the port 53 passes inwardly beyond the sharp corner between these inclined walls and the flow of water can then immediately carry away any foreign particles that may be lodged in this corner. As the valve 44 is not moved outwardly until the flow of water out through the pipe 10 ceases, the pressure in the casing 13 will be the same as in the pipe 6, and the pressure above the valve 16 will be the same as below it. As a result, this valve will descend to the position shown in Fig. 2, and thereby connect the pipe 8 to the fitting 20, as soon as such flow ceases. Water may then circulate through the coil within the heater through the pipe 8, the fitting 20, the thermostat-casing 3 and the pipe 9.

The dimensions and proportions of the various parts shown in the drawings may all be modified as may be found desirable by heating engineers without departing from the spirit of our invention.

We claim—

1. A controlling device for water heaters, comprising a water-valve body, a water-valve slidable therein, a piston slidable in said water-valve, a piston-rod connected to the piston, a gas-valve body and a valve therein movable from its seat by said piston-rod, a spring to return the piston to normal position, and a spring mounted on and operable by the piston-rod to move the water-valve to normal position.

2. A controlling device for water heaters comprising a water chamber, a piston-rod slidable therein and operable by the water passing through the water chamber, a fuel-valve body, a fuel-valve therein adapted to be opened by said piston-rod, means for closing said fuel-valve, a second fuel-valve within the fuel-valve body and held on its seat by its own weight and the pressure of the fuel, a lever pivoted adjacent said second fuel-valve, and a spring connecting the lever and valve whereby the valve will be lifted when the upward pull of the spring overcomes the weight of the valve and pressure of the gas.

3. A controlling device for water heaters comprising a water chamber, a piston slidable therein and operable by the water passing through said water chamber, a piston-rod connected thereto, a fuel-valve body, a fuel-valve therein adapted to be opened by said piston-rod and normally held closed by the pressure of the fuel, a cylindrical water-valve mounted concentric with said piston and provided with ports in its face to permit the flow of water through said water chamber, and a spring between the valve and piston rod to move said valve to prevent the flow of water through said chamber.

4. A controlling device for water heaters comprising a water-valve body having a cylindrical bore, a cylindrical valve slidable therein provided with a web having openings to permit the passage of water through the same, a piston slidably mounted within the cylindrical portion of said valve, a piston-rod connected thereto, a gas-valve body, a gas-valve therein adapted to be opened by said piston-rod, said water-valve having ports in its cylindrical portion to permit the passage of water through said water-valve body, a spring for moving said water-valve outward to prevent the flow of water through said water-valve body, and a spring to seat said fuel-valve.

5. A controlling device for water heaters comprising a water-valve body having inlet and outlet ports, a valve slidable therein and formed by a cylindrical portion provided with ports adapted to register with inlet and outlet ports of the valve-body and a web provided with passages to permit water to flow through the same, a piston-rod slidably mounted in said valve, a piston mounted on the outer end of said rod and slidable within the cylindrical portion of said valve, a fuel-valve body, a fuel-valve mounted therein and adapted to be moved from its seat by means of said piston-rod, and a spring to return said fuel-valve to its seat.

6. In a controlling device for water heaters, the combination of a water-valve body having inlet and outlet ports, a valve slidable therein and comprising a cylindrical portion provided with ports adapted to register with the inlet and outlet ports of the valve body and a web provided with passages to permit water to flow through the same, a piston-rod freely slidable in said valve, a piston mounted on the outer end of said rod and slidable within the cylindrical portion of said valve and adapted to move the valve inward to open the outlet port of said valve-body, a spring mounted on the piston-rod to move the valve outward, a second spring to move the piston and piston-rod outward, a fuel-valve body, a fuel-valve mounted therein and adapted to be moved from its seat by said piston-rod, and a spring to return the fuel-valve to its seat.

7. In a controlling device for water heaters, the combination with the fuel-valve, of a water-valve body, a cylindrical valve slidable therein, a piston slidable within the valve and moved inwardly by the pressure of water, a piston-rod connected to said piston and adapted to operate the fuel-valve, a sleeve connected to said rod, a coil-spring on said sleeve to move the piston-rod and piston outwardly, a spring within the sleeve to move the cylindrical valve outwardly, and a spring to close the fuel-valve.

8. In a controlling device for water-heaters, the combination with a fuel-valve, of a cylindrical water-valve body having inlet and outlet ports, a cylindrical valve slidable in said body and having a port adapted to register with the outlet port of the body when said valve is moved inwardly, said outlet port having walls which meet at an outwardly pointed angle, so that the area of the opening is reduced as the valve moves outwardly, and means mounted adjacent the valve and actuated by the water pressure for moving the fuel-valve from its seat.

9. A controlling device for water heaters comprising a water-valve body, a valve slidable therein, a piston in said water-valve body, a piston-rod connected thereto, a fuel-valve body, a fuel-valve therein adapted to be opened by said piston-rod, means for normally closing said fuel-valve, a second valve within said fuel-valve body normally held on its seat by the pressure of the fuel, a lever to lift said second valve from its seat, a vertically movable sleeve mounted above the valve, a spring operatively connecting said sleeve and valve, and a thermostatic device in engagement with said lever to cause it to lift said sleeve and thereby move said second valve from its seat when the temperature of the water surrounding the thermostatic device falls below a predetermined degree of temperature.

10. A controlling device for water heaters comprising a water-valve body and a piston therein, a piston-rod connected to said piston, a fuel-valve body and a valve therein adapted to be moved from its seat by the piston-rod, means to return said fuel-valve to its seat, a circulating valve body, a pipe connecting the lower end of the same to the water-valve body, and a second pipe connecting the upper end of the circulating valve body to the heater, said circulating valve body having a port between its ends also opening to the heater, a circulating valve slidable across said port so as to permit the water to flow from the water-valve to the heater or to circulate through the valve and heater, and an adjustable screw means to limit the movement of said valve and thereby control the flow of water from the water-valve to the heater.

In testimony whereof we have signed this specification in the presence of two subscribing witnesses.

HENRY EISENACH.
WILLIAM F. SMITH.

Witnesses:
EDWARD N. PAGELSEN,
JAY FULLER.